United States Patent Office 3,740,360
Patented June 19, 1973

3,740,360
SEALING COMPOSITION AND METHOD
Kenneth H. Nimerick, Tulsa, Okla., assignor to The Dow Chemical Company, Midland, Mich.
No Drawing. Continuation-in-part of application Ser. No. 730,578, May 20, 1968. This application Nov. 12, 1970, Ser. No. 89,150
The portion of the term of the patent subsequent to Oct. 26, 1988, has been disclaimed
Int. Cl. C08d 9/06
U.S. Cl. 260—17.4 ST                 19 Claims

ABSTRACT OF THE DISCLOSURE

A composition is provided which may be employed for the selective sealing of permeable formations. The composition contains at least one particulate galactomannan gum which is treated with a hydrophobing agent to render the gum hydrophobic in aqueous solutions having a pH of at least about 7.5, a pH control agent and a water-soluble organic polymeric suspending agent. Optionally, a degradation agent, a cross-linking agent and/or a hydration agent can be included.

CROSS-REFERENCE TO RELATED APPLICATION

This application is a continuation-in-part of application Ser. No. 730,578, filed May 20, 1968, now U.S. Pat. No. 3,615,794.

BACKGROUND OF THE INVENTION

It is often desirous to temporarily seal or plug a permeable formation such as one located in a subterranean formation penetrated by an opening, e.g., a borehole. This may be done for several purposes such as, for example, so that other less permeable zones can be treated in some manner (e.g., fractured, acidized, etc.). Many methods and compositions have been employed for temporarily plugging or sealing the openings and passageways located in such formations. For example, fibrous, flaky or granular materials, various cements and viscous gels have been employed as plugging and sealing agents.

These present methods and agents suffer from certain disadvantages. Fibrous materials, e.g., hay, sponges, etc., do not perform with predictable success and in many instances an impervious seal is not obtained in vuggs or fissures located in such formations even when large quantities of material are pumped into the treatment zone. Cementing requires an extended period of time both to allow the cement to set and to break through (drill, perforate, etc.) the cement once circulation is again desired. Furthermore, cementing can be quite expensive and also can cause serious damage to producing formations. The more recent use of gels such as cross-linked polysaccharides, has proved to be a great improvement over the former methods. However, difficulties found in the use of many of these gels include, instability of the gels with pH changes, non-uniformity of the gel solutions placed into the borehole, premature setting up of the gels (hydration and cross-linking), a prolonged setting time, failure of the gel to break down within a certain predetermined period of time, high fluid loss of the unset gels, weakness of the set gel to extrusion caused by pressures and low resistance to elevated temperatures.

A need, therefore, exists for a composition that can be emplaced in a permeable formation as a readily pumpable slurry, thereafter sets up in place to form a mass capable of withstanding appreciable pressure, and subsequently liquefies so that the plug ceases to restrict the flow of fluids through the formation. The present composition demonstrates uniformity, strength, predictable gelation and setting and breakdown times, good fluid retaining characteristics, and stability to a wide range of pH values (i.e., the slurry may be prepared at the site of use employing locally available water supplies having a wide divergence in initial pH values, e.g., 3 to 10).

As employed herein, a readily pumpable slurry is a slurry having rheological properties such that is can be pumped through about 100 feet of 2 inch inside diameter pipe at a minimum rate of about 2 barrels per minute with about 100 p.s.i. pumping pressure.

SUMMARY OF THE INVENTION

The present invention comprises a granulated formulation; an aqueous slurry composition containing a portion of the constituents of the granulated formation in solution, and a method of treating a permeable formation employing the slurry.

The granulated composition comprises a galactomannan gum which has been treated with a hydrophobing agent to render the gum hydrophobic (less hydrophilic than normal) when dispersed in an aqueous solution having a pH of at least about 7.5, a pH control agent, and a water-soluble organic polymer suspending agent. Optionally, a degradation agent for a hydrated form of the gum, and/or a cross-linking agent for the hydrated gum and/or a hydration agent can be employed.

To employ the granulated composition, it is mixed with a sufficient amount of an aqueous carrier liquid (e.g., water, brine, etc.) to make a readily pumpable slurry. The slurry (which is slightly viscous) is injected (such as by pumping under pressure) into the formation to be treated where it autogenously gels, i.e., sets up, to give a temporary, fluid-tight, pressure resistant, rigid gel which subsequently (after a period of time) disintegrates and ceases to plug.

PREFERRED EMBODIMENTS OF THE INVENTION

In the practice of the present invention, the granulated composition comprises the following combination of constituents as parts by weight:

| Constituent | I range | II preferred |
|---|---|---|
| Galactomannan gum and effective quanity of hydrophobing agent | 150–1,500 | 300–750 |
| Water-soluble organic polymeric suspending agent | 3–60 | 6–30 |
| pH control agent | 12–120 | 24–60 |
| Hydration agent | 0.5–100 | 2–50 |
| Cross-linking agent | 0.01–300 | 0.03–150 |
| Degradation agent | 0–20 | 1–15 |

To make the novel slurry composition of the present invention the constituents listed above (in pounds) are admixed with a sufficient quantity of an aqueous solution to make an equivalent of 1000 gallons of slurry. Thus, about an equivalent of about 175 pounds to about 2100 pounds of the composition defined by Column I or from about 330 to about 1055 pounds of the preferred composition (Column II) are admixed with a sufficient quantity of an aqueous solution to make about 1000 gallons of the indicated slurry.

Galactomannan gum as employed herein refers to those natural occurring polysaccharides derived from various endosperms of seeds. They are primarily composed of D-mannose and D-galactose units. They generally have similar physical properties, such as being soluble in water to form thick highly viscous solutions which usually can be gelled (cross-linked) by the addition of such inorganic salts as borax. Examples of some plants producing seeds containing galactomannan gums including Tara, Huizache, locust bean, Palo verde, Flame tree, guar bean plant, Honey locust, Lucerne, Kentucky coffee bean, Japanese pagoda tree, Indigo, Jenna, Rattlehox, Clover, Fenergruk seeds and Soy bean hulls. The gum is provided in a convenient particulate form generally smaller than what will be retained on a No. 20 mesh sieve (U.S. Standard Sieve Series) but larger than that which passes through a No. 200 mesh sieve.

A hydrophobically treated galactomannan gum is a galactomannan gum which has been treated in such a manner that the normal hydrophilic properties of the gum are inhibited sufficiently to allow the gum to be dispersed in an aqueous carrier liquid and the dispersion to be emplaced into a permeable zone before any substantial hydration (swelling or opening) of the gum occurs. The treating agent is herein referred to as a hydrophobing agent. To render the gum hydrophobic it may actually be pretreated to undergo some physical or chemical change prior to being placed in an aqueous carrier liquid (e.g., by being treated with a suitable hydrophobing agent) or it may be associated with (coated, admixed with, etc.) a hydrophobing agent which affects the normally hydrophilic characteristic of the gum after being placed into the carrier liquid.

The hydrophobing agent may be any material capable of temporarily inhibiting the natural (normal) hydrophilic property of the gum. An example of a hydrophobing agent which affects the hydrophilic characteristic of the gum after being dispersed in an aqueous medium is a material capable of liberating borate ions when added to water, e.g., alkali metal borates. Sodium tetraborate (borax), sodium perborate, and sodium metaborate are preferred agents for use in the practice of the present invention. Details of one method for pretreating the gums with a hydrophobing agent is taught in U.S. Pat. No. 2,868,664. Generally, a sufficient amount of a boron containing agent is employed to bring the pH of an aqueous dispersion of the gums up to at least about 7.5. From about 0.5 to 1.0 percent by weight of such agent, based on the weight of the gum, is usually sufficient. Preferred gums are guar, tara or locust bean treated with a borate ion liberating material.

Further information is available on the subject of borate-treated galactomannans in Chemical Abstracts, vol. 43, Part 3, Column 6936c of Sept.-Nov. 1949 and in Industrial Gums by Whistler and BeMiller; published by the Academic Press, New York (1959), p. 339.

A hydrophobically treated galactomannan gum hydrates very slowly in aqueous solutions having a neutral or alkaline pH but hydrates very quickly in acidic aqueous solutions. The exact amount of gum employed for gel stability will depend to some extent on the temperature to which the set gel will be subjected in the formation to be treated. At higher temperature levels, e.g., greater than about 125° F., a greater amount of the gum should be present. For example, above 125° F. a gel composition containing guar gum, polyacrylamide and sodium dichromate at a total concentration of about 500 lbs./960 gallons of water has been found to be satisfactory whereas a concentration of only about 300 lbs./980 gallons of water was found practical for use at temperatures ranging from about 60° F. to 125° F.

The suspending agent comprises a water-soluble organic polymer which is readily dispersible in aqueous solutions having a neutral to alkaline pH, i.e., the initial pH of an aqueous dispersion of the slurry composition of the present invention, to form visually continuous solutions or dispersions.

The terminology "water-soluble, organic polymer," as used herein refers to nonionic, anionic, cationic or ampholytic organic materials composed of a number of repeating units or mers. The useful polymers are characterized by dispersibility in water to form visually continuous solutions or dispersions. This includes truly water-soluble polymers which disperse in water to provide homogeneous, transparent solutions subject to water dilution without phase separation. Also included within the meaning of water-soluble, as used herein, are the water-swellable polymers which readily disperse in water to provide a highly disperse and visually continuous system of individually distinct, gel particles.

The water-soluble, organic polymers useful herein are available in a wide variety of chemical compositions. They may be obtained as natural polymeric products, by modification of natural polymers or by synthesis from polymerizable materials.

Water solubility is imparted to such polymers by the presence in and along the polymer chain of a number of hydrophilic moieties sufficient to more than offset the otherwise hydrophobic character of the organic polymer. One class of such hydrophilic moieties includes the ionizable groups. Among these are the sulfate and sulfonate groups, carboxylate salt groups, amino and ammonium groups, the latter being inclusive of protonated as well as quaternary derivatives of the amines, e.g., mono-, di- and trialkyl substituted ammonium salt groups, and phosphoric acid groups and mono- and dibasic salts thereof. Whenever acid salts are referred to, those generally intended are the alkali metal, alkaline earth metal ((water-soluble species thereof) and ammonium salts.

Another class of water-solubility imparting, hydrophilic moieties are such nonionizable groups as carboxamide and mono- and dialkyl N-substituted carboxamides, having a total of up to about 8 carbons. Also of a hydrophilic nature, though less strongly than some of the aforementioned groups are, hydroxyl, acetal, ketal, carbamate and lactam groups. In any event, the polymers employed herein contain one or more of the aforedescribed hydrophilic moieties, and the like, in and along the polymer chain in a sufficient amount to render the resulting polymer water-soluble as defined above.

The polymers used in the invention are characterized by a high molecular weight. An adequate molecular weight is shown if the polymer can be obtained as a particulate solid and a 2 percent by weight solution of the polymer in water, at a pH of 7, has a viscosity measured with a Brookfield viscosimeter at 25° C. of at least 10 centipoises.

Technology for preparing the water-soluble polymers useful herein is known. Useful ethylenically polymerized polymers are described in Hedrick et al., U.S. Pat. 2,625,-529, Aimone et al., U.S. Pat. 2,740,522 and Booth et al., U.S. Pat. 2,729,557. A variety of water-soluble polysaccharide derivatives are described in Gloor, U.S. Pat. 2,728,725. Water-soluble polyurethanes or chain extended polyols are taught in Honea et al., U.S. Pat. 3,054,778 and a variety of polycarbonates and polylactams in Hibbard et al., U.S. Pat. 3,044,982, Walles et al., U.S. Pat. 2,946,772, Vitales, U.S. Pat. 2,874,124 and Fong et al., U.S. Pat. 3,000,830. These are to mention but a few of the well-known chemical avenues for the preparation of water-soluble, macromolecules. Further general descriptions of a variety of water-soluble, particulate macromolecules is contained in Davidson and Sittig, "Water Soluble Resins," Reinhold Publishing Corp., New York, 1962.

Preferred for use herein are water-soluble carbamoyl polymers. The most common forms of these are ethylenically polymerized polymers having attached along their polyalkane backbone a plurality of carbamoyl groups according to the formula:

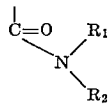

wherein $R_1$ and $R_2$ are independently selected from the group of hydrogen and alkyl hydrocarbons with 1 to 4 carbons.

In particular, useful carbamoyl polymers include the various water-soluble homopolymers and copolymers of acrylamide and methacrylamide. Other carbamoyl polymers are the various water-soluble copolymers of N-substituted acrylamides such as N-methyl acrylamide, N- propyl acrylamide and N-butyl acrylamide. Still other carbamoyl polymers are prepared from the amides and half amides of maleic and fumaric acids. In general, any ethylenically unsaturated and polymerizable monomer, which contains the carbamoyl group, may be employed in the preparation of the preferred carbamoyl polymers.

Best results are obtained, if at least about 25 mole percent of the polymerized mers have carbamoyl substituents. The balance of the comonomers used to prepare the copolymers can be provided in the form of any water-soluble, or water-insoluble, monoethylenically monomer copolymerizable therewith, so long as the total amount of water-soluble monomers used is sufficient to impart water-solubility to the finished polymer.

Other water-soluble polymers useful herein are the lightly cross-linked water-swellable polymers. Such cross-linking can be achieved by irradiation of linear, water-soluble polymers under conditions which promote cross-linking or by incorporating a small amount, e.g., up to 1% by weight, of a polyfunctional monomer into the polymerization recipe for a linear water-soluble polymer. Examples of such monomers, which may be copolymerized with monoethylenically unsaturated monomers, are methylenebisacrylamide, divinylbenzene, divinylether, divinylether of ethylene glycol and the like.

It is usually preferred that the suspending agent forms a near neutral or basic pH value when dispersed in an aqueous solution, i.e., one which will not cause an acidic pH and thus cause a premature swelling of the hydrophobically treated gum.

As indicated, one type of polymer found to be especially effective for this purpose is acrylamide polymers, including specifically polyacrylamide in varying degrees of hydrolysis and acrylamide copolymerized with one or more ethylenically unsaturated monomers such as acrylic acid, methacrylic acid, vinylsulfonic acid, vinylbenzylsulfonic acid, vinylbenzenesulfonic acid, and alkali and alkaline earth metal salts of such acids as described in U.S. Pat. 2,831,841, column 3, lines 34 to 45, and in U.S. Pat. 2,909,508, Examples 1 to 5.

Preferably the acrylamide polymer and acrylamide copolymers are those having a molecular weight such that when dispersed in a neutral or alkaline solution in an amount ranging from about 0.05 to about 1% by weight give a viscosity ranging from about 5 to about 200 centipoises at ambient temperatures. Preferably the viscosity is achieved within about 10 minutes.

A particularly good suspending agent to employ is a polymer of from about 40 to 60 vinylpyrrolidone and 60 to 40 acrylamide (molar proportions) copolymerized by mixing between about 0.5 and 1.0 percent, by weight, of the monomeric mixture of a cross-linking agent, e.g., methylenebisacrylamide, in the presence of between about 0.1 and 0.5 percent of a catalyst, e.g., azobisisobutyronitrile, in about a 10 to 40% aqueous dispersion.

Other water-soluble organic polymeric materials found effective are synthetic derivatives of cellulose and natural occurring water-soluble gums which are not effected by the presence of the hydrophobing agent and which produce a neutral to alkaline pH when dispersed in an aqueous solution, and modified starches having similar characteristics. Examples of natural gums which give a near neutral pH are the tree exudates including gum arabic, gum tragacanth, kutera gum, ghati, mesquite gum and the like. Cellulose derivatives which may be employed include, for example, methylcellulose, hydroxy propyl methylcellulose, cellulose ethers and esters, e.g., as set out in Encyclopedia of Chemical Technology, 2nd ed., vol. 4, page 618, John Wiley and Sons, New York, and other similar suspending agents. The exact agent employed is not critical to the practice of the invention except to the extent that it functions as defined hereinbefore.

Preferably the suspending agent is employed in an amount ranging from 0.05 to 10 percent by weight of the galactomannan employed. The exact amount of suspending agent will depend on the amount of hydrophobically treated gum employed, the temperature at which the slurry is to be employed, the other constituents present in the slurry and the capacity of the injection equipment (e.g., pumps, blenders, etc.). The suspending agent allows for the formation of a slightly viscous slurry containing an even dispersion of the galactomannan gums therein and prevents fluid loss of the initial slurries so that the gum can be emplaced into position in the permeable zone to be treated.

A pH control agent should be employed to maintain the pH of the initial slurry at a value of at least about 7.5, preferably between about 8 and 12. This assures that the hydrophobically treated gum will not prematurely swell because of acidic conditions. A hydroxyl ion releasing material and/or preferably a buffering agent can be employed.

The hydroxyl ion releasing agent may be any soluble or partially soluble hydroxide or carbonate that provides the desirable pH value in the slurry. $Ca(OH)_2$ or $Mg(OH)_2$ are preferred. Other acceptable materials are $Bi(OH)_3$, $Co(OH)_2$, $Pb(OH)_2$, $Ni(OH)_2$, $Ba(OH)_2$, $Sr(OH)_2$ and the alkali metal hydroxides and carbonates. The amount of the hydroxyl ion source to provide is that which is sufficient to yield a pH value in water of at least about 7.5 and preferably between about 8.0 and about 12.0.

A buffering agent is preferably employed in the practice of the present invention, to provide a buffer solution, i.e., a solution to which moderate amounts of either a strong base or acid may be added without causing any large change in pH value of the solution. A buffer solution usually contains a weak acid and a salt of the weak acid; an acid salt with a normal salt; or a mixture of two acid salts. Examples of suitable buffering agents which may be employed to provide a buffered solution having the desired pH value are $NaH_2PO_4$-$Na_2HPO_4$; boric acid-sodium hydroxide; citric acid-sodium hydroxide; boric acid-borax; sodium carbonate-sodium bicarbonate; and sodium bicarbonate, or other like agents. By employing a buffering agent instead of merely a hydroxyl ion producing material a composition is provided which is more stable to a wide variance of pH values found in local water supplies and to the influence of acidic materials located in formations and the like. The pH control agent may be varied between about 0.6% and about 40% by weight of the treated gum employed.

When the composition of the present invention is to be employed under conditions where the ambient temperature is greater than about 175° F., a hydration agent is usually not required. At temperatures below 175° F., hydrolysis of the treated gum will not usually readily occur. Above 175° F., sufficient energy is present to allow hydrolysis and subsequent increases in viscosity of the aqueous slurry. It is known that galactomannans as a class are degraded by both acidic conditions and by heating to temperatures above 150° F. Most rapid degradation occurs when both high temperatures and an acidic pH (less than 7.0) are present. It has been found that as a galactomannan water system is heated to elevated temperatures, i.e., above about 150° F., the pH of the solution decreases, becoming more acidic. It has been postulated that such decrease in pH is the result of degradation of the galactomannan to produce various organic acids. It is, therefore, one purpose of this invention to recognize the foregoing hypothesis as applicable and to use various metal hydroxides as a means of neutralizing these organic acids as they are formed or by employing a buffering agent to provide a buffered solution. By neutralizing said organic acids or by providing a buffered solution, the rate of degradation is retarded and the efficiency of the gum system is extended.

However, it is preferred to employ a hydration agent in the present invention to assure a substantially complete hydration of the treated gum after a period of time. The hydration agent is a material which after a period of time causes a lowering of the pH of the slurry of treated gum to an acidic range. Included are acids which hydrolyze after a delayed period of time, e.g., propionic acid, maleic acid, succinic acid, tartaric acid, citric acid and the like. Other materials include any acidic material which will not degrade the treated gum and which has been treated so that there is a delay in its hydrolysis when dispersed in an aqueous solution. Suitable acidic materials include, for example, water-soluble acid salts such as monosodium phosphate, aluminum sulfate, and ammonium chloride, normally solid organic and inorganic acids such as citric and boric acid, and acid reacting aldehydes such as glyoxal and pyruvic aldehyde. The material with which these acid materials are treated to delay their hydrolysis includes, by way of example, a coating of a polyethylene glycol having an average molecular weight of at least about 2000 and preferably in the range of from about 6000 to 2500, gelatin, salol and other like materials.

The granulated and slurry composition of the invention also preferably contains a cross-linking agent for the hydrated form of the treated gum. A cross-linked gum is generally much stronger than a corresponding uncrosslinked hydrated gum. Suitable cross-linking agents include water-soluble compounds containing polyvalent metal cations which form insoluble hydroxides in aqueous solutions having a pH lower than about 7. These compounds include, for example, water-soluble compounds containing zirconium, chromium and tin. Other water-soluble compounds which produce the following ions in aqueous solutions having an acidic pH can also be employed: $Sb^{+3}$, $Bi^{+3}$, $SbO^{+1}$, $BiO^{+1}$, $Ni^{+2}$, $Fe^{+2}$, $MoO_4^{-2}$, $WO_4^{-2}$, $CrO_4^{-2}$. Other cross-linking agents include for example, oxides and organic and inorganic salts of bismuth and antimony, e.g., antimony oxide, antimony chloride, antimony oxychloride, antimony sulfate, antimonyl sulfate, antimony tartrate, potassium antimonyl tartrate, sodium pyroantimonate, antimony fluoride, antimony citrate, bismuth oxide, bismuth chloride, bismuth citrate, sodium bismuthate, bismuth nitrate and mixtures thereof. Other cross-linking agents include sodium and potassium dichromate, zinc chromate, barium chromate and potassium pyroantimonate.

A material which contains a suitable cross-linking ion and which also hydrolyzes to produce an acid solution can also be employed. These materials include, for example, salts of strong acids containing a polyvalent ion which cross-links the hydrated gum. These include, for example, sodium dichromate, potassium dichromate, stannic chloride, zirconyl chloride, chromium nitrate and the like.

The cross-linking agent in the form of the first defined type may be employed in an amount ranging from 0.01 to about 20 percent by weight of the galactomannan gum to be cross-linked. The exact amount will depend on such factors as gum and buffer concentration and the temperature of the gel solution. Sodium dichromate and chromium nitrate have been found to be preferred cross-linking and hydration agents. They dissolve quickly in the aqueous solution, have a characteristic time delayed hydrolysis rate and are cross-linkers for the galactomannan gums, e.g., guar gum.

A degradation agent is optionally employed to predictably degrade the set gel after a predetermined period of time. The specific degradation agent employed will depend on the temperature to which the set gel is subjected. At temperatures ranging from about 125° to 200° F., an inorganic breaker, e.g., $KBrO_3$ and other similar materials, e.g., $KClO_3$, $KIO_3$, peroxides, perborates, persulfates, permanganates and the like, are used to control degradation of the set gel. At temperatures ranging from about 60° to 140° F., an enzyme may be employed. The selection of a suitable enzyme for a particular gum can be determined from references well known in the art, see for example Smith and Montgomery, The Chemistry of Plant Gums, Monograph Series, No. 141, 1959, pp. 151–156. The amount of enzyme employed in any particular gel solution as defined herein will depend on the amount of galactomannan gum present, and also upon the temperature and pH to which the set gel is to be subjected. Generally, about 0.01 to 2.0 percent by weight of enzyme to the weight of gum employed is satisfactory.

Frequently, fluid-loss control agents (in addition to the water-soluble organic polymers) are advantageously employed in the practice of the invention. The preferred material is silica flour (particles having an average size of about 1 to 10 microns. However, any substantially inert organic or inorganic pulverulent material (including starches and the like) may be employed as the fluid-loss control additive.

All the particulate constituents of the invention can be premixed and packaged in a convenient form. When ready for use, the particulate product is simply admixed with the necessary quantity of an aqueous solution, to form an aqueous slurry of the treated gum. The slurry is then pumped into the permeable formation to be treated whereupon it sets up to form a firm plug. The set plug will breakdown after a predetermined period of time, thus allowing circulation through the treated area.

Since the ingredients are readily dispersible, the composition of the invention is easily prepared. It exhibits excellent low fluid-loss, thickens at a controllable rate which may be a relatively short time, if desirable, e.g., between ½ hour and 1 hour, or over a period of several hours if preferred, and thereafter liquefies within a few hours or longer, as desired.

In the following examples, tests were conducted to show the desirable properties of the gelled composition of the invention. In these examples, thickening time, which herein is also considered the gel time, was determined according to Section 10, page 20 et seq., of API RP 10B (March 1965), employing the schedule designated herein for each series of tests. The gel time is also referred to herein sometimes as working time because it is the permissible time between admixture of the ingredients and the gelation during which the composition remains fluid.

The time between gelation and breakdown or liquefaction of the gelled plug is called herein plug life. It was determined as follows:

A vertically held ¾-inch diameter 6-inch long steel pipe nipple, capped at the lower end, and containing a ⅜-inch diameter steel ball, was nearly filled (allowing a little room for expansion) with a quantity of the slurry gelable composition. A cap was placed on the top of the nipple and it, with its contents put vertically in a bath which had been preheated to a specified temperature. Thereafter, at 15-minute intervals, the nipple was inverted, the ball falling freely through the ungelled fluid. The inverting process was continued through the gelation stage, at which time the ball became firmly in an immobile state by the gelled composition, and thereafter the periodic inversion further continued until the gel broke and again allowed the ball to fall freely. The sound of the ball striking the cap at the bottom of the nipple when inverted indicated that the gel had liquefied, and this was recorded as the plug life. The reliability of this test was also confirmed by opening the system and observing the state of the admixture.

EXAMPLE 1

500 pounds of particulated hydrophobically treated guar gum (prepared according to U.S. Pat. 2,868,664) were admixed with 50 pounds of linear polyacrylamide, about 30% hydrolyzed, and enough water to make 1,000 gallons, at an ambient temperature of about 70° F. One portion of the composition so made was tested at 250° F. for working time (time elapsed between mixing and state of gel taken as 100 poises) recorded in minutes according to the procedure of Schedule 19 of Section 10 of API RP 10B. A second portion was tested for plug life as above described.

A second series of tests (Nos. 2–6) were conducted at a temperature of 250° F. and an increasing amount of soda ash (commercial grade $Na_2CO_3$) was admixed with the borated guar gum prior to admixture of the polyacrylamide.

A third series of tests (Nos. 7 and 8) were conducted at a temperature of 250° F. employing $Ca(OH)_2$ instead of soda ash.

A fourth series test (No. 9) was conducted as in the third series except that the temperature of the test was 265° F. and the working time was determined according to Schedule 20 of Section 10 of API RP 10B.

In the fifth series of tests (Nos. 10–19), the tests were conducted according to the procedure followed in the fourth series except that the temperature of the test was 300° F. and either soda ash or $Ca(OH)_2$ was admixed with the borated guar gum before admixing the polyacrylamide therewith.

In the final series of tests (Nos. 20 and 21) tests were conducted according to the procedure in the fifth series except the temperature employed was 325° F. and the Schedule of Section 10 of the API RP 10B followed was Schedule 21.

The results of these tests are shown in Table I.

TABLE I 500 pounds of borated guar gum and 50 pounds of acrylamide polymer per 1,000 gallons of dispersion

| Test No. | Additive in pounds per 1,000 gallons of composition | pH value when made up | Temperature of test in °F. | Working time in minutes to reach 100 poises | Section 10 API RP 10B schedule followed | Plug life |
|---|---|---|---|---|---|---|
| 1 | None | 8.6 | 250 | 48 | 19 | 4.5 days. |
| 2 | 5 $Na_2CO_3$ | | 250 | 60 | 19 | Do. |
| 3 | 10 $Na_2CO_3$ | 9.3 | 250 | 125 | 19 | 6.5 days. |
| 4 | 30 $Na_2CO_3$ | 9.8 | 250 | 290 | 19 | 7.0 days. |
| 5 | 50 $Na_2CO_3$ | 10.1 | 250 | | 19 | 8.0 days. |
| 6 | 80 $Na_2CO_3$ | 10.15 | 250 | | 19 | Do. |
| 7 | 5 $Ca(OH)_2$ | 10.0 | 250 | 100 | 19 | 5.5 days. |
| 8 | 20 $Ca(OH)_2$ | | 250 | 300 | 19 | 8.0 days. |
| 9 | 50 $Ca(OH)_2$ | 11.7 | 265 | 185 | 20 | 8.5 days. |
| 10 | 10 $Na_2CO_3$ | 9.3 | 300 | 40 | 21 | 23.5 hours. |
| 11 | 40 $Na_2CO_3$ | | 300 | 80 | 21 | 28.5 hours. |
| 12 | 50 $Na_2CO_3$ | 10.1 | 300 | 130 | 21 | 20.0 hours. |
| 13 | 100 $Na_2CO_3$ | 10.4 | 300 | 160 | 21 | 24.0 hours. |
| 14 | 250 $Na_2CO_3$ | 10.5 | 300 | 190 | 21 | 20.0 hours. |
| 15 | 400 $Na_2CO_3$ | 10.5 | 300 | 150 | 21 | 64.0 hours. |
| 16 | 40 $Ca(OH)_2$ | | 300 | 85 | 21 | 32.0 hours. |
| 17 | 75 $Ca(OH)_2$ | 11.8 | 300 | 120 | 21 | 74.0 hours. |
| 18 | 100 $Ca(OH)_2$ | 11.9 | 300 | 115 | 21 | 78.0 hours. |
| 19 | 160 $Ca(OH)_2$ | 12.0 | 300 | 105 | 21 | 85.0 hours. |
| 20 | 160 $Ca(OH)_2$ | 12.0 | 325 | 80 | 21 | 9.0 hours. |
| 21 | 250 $Ca(OH)_2$ | 12.4 | 325 | 75 | 21 | 10.0 hours. |

EXAMPLE 2

In this example, tests were conducted similarly to those in Example 1 except that 750 pounds of a borated treated galactomannan gum (as exemplified by borated guar gum) were used and the temperatures of each test was increased by 25 Fahrenheit degrees as shown in Table II. The resulted working time and plug life tests are also shown in Table II.

TABLE II

750 Pounds of Borated Guar Gum and 50 Pounds of Polyacrylamide Per 1,000 Gallons of Dispersion

| Test No. | Additive in pounds per 1,000 gallons of composition | Temperature of test in °F. | Working time in minutes to reach 100 poises | Section 10 API RP 10B schedule followed | Plug life in days |
|---|---|---|---|---|---|
| 22 | 160 $Ca(OH)_2$ | 275 | 95 | 20 | 14.5 |
| 23 | 160 $Ca(OH)_2$ | 300 | 63 | 21 | 5 |
| 24 | 160 $Ca(OH)_2$ | 325 | 57 | 21 | 1¾ |

Reference to Tables I and II shows that a suitable plug can be made at temperatures from 175° F. to 325° F., employing a borated galactomannan gum and a polyacrylamide polymer. It can be seen that the higher the temperature, the faster the composition gels. However, it is shown that the rate of gel can be retarded by the use of such alkaline materials as sodium carbonate and $Ca(OH)_2$. The tables also show that as little as 25 pounds of an acrylamide polymer both suspends the borated galactomannan gum and also imparts a moderate increase in pH value to provide an adquate working time within a temperature range of between about 175° F. and about 200° F. At above about 225°, the acrylamide polymer concentration is best increased to at least about 50 pounds per 1,000 gallons of composition. It is preferable that the amount be increased to about 75 pounds, per 1000 gallons of gelable composition, at temperatures approaching 300° F. and above.

The degeneration or dissolution of the plug after emplacement occurs over a predetermined period of time. The higher the ambient temperature of the emplaced plug, the more rapid the degeneration of the plug. For example, a composition comprising 500 pounds of the borated guar gum and 50 pounds of the polyacrylamide remains solid up to about 28 days at about 200° F.; for about 16 days at about 225° F.; for about 5 days at 250° F. This length of time for dissolution or desintegration (gel-breaking) of the plug is usually longer than is desirable. Therefore, les alkaline material, e.g., $Ca(OH)_2$ or $Na_2CO_3$, can be admixed therewith to delay the gel-breaking period.

It is shown in the tables also that, at temperatures above about 250° F., the working time of the aqueous suspension of the borated galactomannan gum containing the acrylamide polymer in the absence of the alkaline material to raise the pH value, is too short for common use. It is shown, however, that the addition of $Ca(OH)_2$ or $Na_2CO_3$ lengthens the working time. Accordingly, the addition of such alkaline materials provide the attainment of both objectives: an increased working time and lengthened plug life, as desired.

It is also shown that plug life, above a temperature of about 275° F., may be increased by increasing the borated galactomannan gum employed, say on the order of about 750 pounds thereof per 1,000 gallons of aqueous composition being prepared.

EXAMPLE 3

In this example tests were conducted to show the effect of increasing the concentration of borated galactomannan gum in water and of admixing therewith varying amounts of $Ca(OH)_2$. The procedure followed was to slurry the borated gum, herein borated guar gum, in the amount given in Table III below, with the amount of water necessary to give the desired concentration, admix therewith the $Ca(OH)_2$ when employed, and thereafter admix 25 pounds of a polyacrylamide (about 30% hydrolyzed and having an average molecular weight of between 2 and 3 million) known commercially as under the trademark Separan. The slurry so made was then placed in tubes and immersed in an oil bath, which had been preheated to 225° F. The composition was observed to gel and then further observed so as to determine the time which elapsed before the gel broke. It was considered broken when the viscosity dropped to under 10 poises.

The results are shown in Table III.

TABLE III

| Test No. | Pounds of borated guar gum per 1,000 gallons of composition | Pounds of Ca(OH)₂ added per 1,000 gallons of composition | Plug life in days |
|---|---|---|---|
| 25 | 50 | None | 3 |
| 26 | 50 | 1.0 | 7 |
| 27 | 50 | 5.0 | 10 |
| 28 | 50 | 10.0 | 15 |
| 29 | 100 | None | 5 |
| 30 | 100 | 1.0 | 7 |
| 31 | 100 | 5.0 | 11 |
| 32 | 100 | 10.0 | 17 |
| 33 | 200 | None | 10 |
| 34 | 200 | 1.0 | 18 |
| 35 | 200 | 5.0 | 24 |
| 36 | 200 | 10.0 | 30 |
| 37 | 300 | None | 14 |
| 38 | 300 | 1.0 | 23 |
| 39 | 300 | 5.0 | 30 |

Reference to Table III shows that the plug life is lengthened as the amount of borated gum is increased. It also shows that the plug life is increased by raising the pH value of the slurry by admixing therewith an hydroxyl ion source, e.g., a soluble hydroxide.

EXAMPLE 4

A further series of tests was conducted to illustrate some alkaline materials that may be used in the practice of the invention to delay the gelation rate and retard the rate of degradation or degeneration of the plug back to a fluid. The procedure followed was to admix the metal hydroxide with water in the proportion of 75 pounds of hydroxide per 1,000 gallons of composition; admixing borated guar gum with the aqueous hydroxide solution in a proportion of 500 pounds of the gum per 1,000 gallons of composition; and then admixing an acrylamide polymer (same as employed in Example 3) in an amount of 50 pounds per 1,000 gallons of composition. The mixture was then transferred to ¾-inch diameter, 6-inch long steel nipples each containing a ⅜-inch ball. Thereafter the nipples, as in the plug life tests above, were capped on both ends and placed in an oil bath, previously heated to 275° F. The nipples were thereafter periodically inverted as above described; when the composition was gelled, the ball became immobile. When the gel later broke, (the break point being considered occurring at a viscosity less than 50 poises) the ball fell with a clearly audible impact to the bottom of the nipple when inverted.

Table IV sets out the results.

TABLE IV

| Test No. | Metal hydroxide employed | pH value as made | Plug life in hours |
|---|---|---|---|
| 45 | None | 8.6 | 48 |
| 46 | Ca(OH)₂ | 12.0 | 120 |
| 47 | Mg(OH)₂ | 9.1 | 60 |
| 48 | Na(OH)₂ | 12.0 | 86 |
| 49 | Bi(OH)₃ | 9.05 | 54 |
| 50 | Cd(OH)₂ | 9.05 | 54 |
| 51 | Pb(OH)₂ | 9.1 | 72 |
| 52 | Ni(OH)₂ | 9.0 | 54 |
| 53 | Ba(OH)₂ | 11.9 | 56 |
| 54 | Sr(OH)₂ | 9.05 | 54 |

Reference to Table IV shows that various metal hydroxides extend the life of the plug composition of the invention when admixed with the borated gum and the thickening agent is thereafter admixed therewith.

EXAMPLE 5

This series of tests was run to show the use of a cellulose derivative viz, hydroxy ethyl cellulose, as a thickening agent in the composition of the invention. The procedure followed consisted essentially of admixing the amount of hydroxyl ion source, viz. Na₂CO₃ or Ca(OH)₂, with water and thereafter admixing the amount of hydroxy ethyl cellulose (abbreviated HEC) set out in Table V below. The pH of the freshly prepared composition, the time in minutes for the composition to reach 100-poise viscosity (taken as the gel point) and the plug life are set out in Table V.

TABLE V

| Test No. | Temperature in °F. | Pounds of borated guar gum per 1,000 gallons of composition | Pounds of HEC/1,000 gallons of composition | Pounds of retarder per 1,000 gallons of composition | | pH value ² when made | Working time in minutes to reach 100 poises | Plug life |
|---|---|---|---|---|---|---|---|---|
| 55 | 200 | 300 | 50 | None | | 7.5–8 | 30 | 10 days. |
| 56 | ¹ 250 | 300 | 50 | 11 | Na₂CO₃ | | 62 | 3 days. |
| 57 | 250 | 300 | 50 | 16 | Same as above. | | | 3–4 days. |
| 58 | 250 | 300 | 50 | 20 | do | | | 4 days. |
| 59 | 250 | 500 | 50 | 15 | do | | | 4 days. |
| 60 | ¹ 275 | 300 | 50 | 15 | do | 10 | 66 | 36 hrs. |
| 61 | 275 | 500 | 50 | 22.5 | do | 10.5 | 67 | 40 hrs. |
| 62 | 275 | 500 | 50 | 27.5 | do | 10.5 | 80 | 44 hrs. |
| 63 | 275 | 500 | 50 | 32.5 | do | 10.5 | 100 | 45 hrs. |
| 64 | 275 | 500 | 50 | 50 | Ca(OH)₂ | 11.5 | 170 | 5 days. |
| 65 | 300 | 500 | None | 30 | Same as above. | | 87 | 18 hrs. |
| 66 | ¹ 300 | 500 | None | 40 | do | | 105 | 20 hrs. |
| 67 | 300 | 500 | 50 | 45 | do | 11.5 | 107 | 26 hrs. |

¹ Squeeze Schedule No. 19 API RP 10B applicable at 250° F. Squeeze Schedule No. 20 API RP 10B applicable at 275° F. Squeeze Schedule No. 21 API RB 10B applicable at 300° F.
² pH values were determined by Hydrion pH Paper.

Reference to Table V shows that a cellulose derivative, e.g., hydroxy ethyl cellulose, is satisfactory as the suspending agent in the composition of the invention and further that the hydroxyl ion sources, as represented by Na₂CO₃ and Ca(OH)₂ perform substantially as efficiently in the presence of hydroxy ethyl cellulose as in presence of polyacrylamide.

EXAMPLE 6

This series of tests was conducted to show the low fluid loss to a porous earthen formation from the composition of the invention, prior to gel, by admixture therewith of a copolymer of 60% N-vinyl-2-pyrrolidone and 40% acrylamide, cross-linked with 0.7% N,N-methylenebisacrylamide, identified in Table VI as polymer "J."

The tests were performed according to the standard Baroid Cell test employing 1-inch diameter, 1-inch long Berea sandstone cores (first saturated with 3% by weight aqueous CaCl₂) employing a pressure of 1000 p.s.i. and the temperature designated in Table VI. The amount of borated guar gum employed in each test was that sufficient to provide 500 pounds per 1000 gallons of composition. The amount of polyacrylamide suspending agent and hydroxyl ion source are shown in Table VI. The fluid loss in minutes and the total volume of liquid composition through the core are also set out in Table VI.

It can be seen that the composition of the invention offers the advantages of providing a temporary plug particularly adaptable for use in porous earthen formations, which is fluid when made, can be readily emplaced as needed, then gels to form a plug of temporary nature which is excellent for diverting subsequently injected

TABLE VI

| Test No. | Ingredients per 1,000 gallons of aqueous composition | | | Permeability to air in md. | Temperature, °F. | Fluid loss in ml. after— | | | | | | Total volume in ml. through cell corrected for 23.5 cm.² area |
|---|---|---|---|---|---|---|---|---|---|---|---|---|
| | Polyacrylamide | "J"¹ fluid loss control polymer | Added hydroxyl ion source | | | 1 min. | 4 min. | 9 min. | 16 min. | 25 min. | 180 min. | |
| 68 | None | None | None | 578 | 175 | 15.5 | 28.5 | 38.0 | Out of fluid | | | |
| 69 | 25 | 16 | do | 667 | 175 | 10.0 | 19.5 | 27.0 | 31 | 35 | 36 | 158.4 |
| 70 | 25 | None | do | 675 | 200 | 10 | 18 | 22 | 24 | 24.5 | 25 | 110 |
| 71 | 25 | 16 | do | 680 | 200 | 5 | 10 | 12.5 | 13 | 13.5 | 15 | 66.0 |
| 72 | 50 | None | do | 590 | 225 | 8 | 18 | 19.0 | 19 | 19 | 19 | 83.6 |
| 73 | 50 | 16 | do | 642 | 225 | 5 | 7 | 7 | 7 | 7.5 | 8.0 | 35.2 |
| 74 | 50 | None | 5 lbs. of Na₂CO₃ | 635 | 250 | 10 | 15 | 20 | 22 | 24 | 24 | 105.6 |
| 75 | 50 | 16 | do | 635 | 250 | 5 | 9.5 | 12.5 | 14 | 14 | 16 | 70.4 |
| 76 | 50 | None | 75 lbs. of Ca(OH)₂ | 632 | 275 | 3 | 4 | 5 | 6.1 | 6.2 | 9.8 | 43.1 |

¹ J polymer is 60% vinylpyrrolidone and 40% acrylamide copolymerized with 0.7% N,N-methylenebisacrylamide as a cross-linking agent.

Reference to Table IV shows that fluid loss from the ungelled composition is greatly lessened by the presence of the specific vinylpyrrolidone-acrylamide cross-linked with methylenebisacrylamide in the amounts shown.

EXAMPLE 7

It is sometimes desirable that the gelled composition be extruded as for example in treating formations comprising vugs and impacked fractures. In such instances, it is desirable that the plug resist up to about 100 pounds or more pressure but that it extrude into the vugs and fractures at relatively high pressures, thereby to serve as an excellent diverting agent for fracturing fluids but which subsequently disintegrates and no longer acts as a plug.

To show that the gelled composition can be extruded into larger openings, e.g., ⅛ to ¼ inch in cross section to simulate vugs and large fractures, tests were performed as follows:

fluids, and which at high pressures can be forced into relatively larger opening farther removed from the entance, and thereafter disintegrates to a fluid which can be easily removed and does no formation damage.

EXAMPLE 8

The effect of the pH of a water supply on the setting time (hydration rate) of a sealing composition within the scope of the present invention was shown in the following manner. Two formuations were employed as test medium. The first formulation (noted as blend A) comprised of, as percent by weight, 93 percent borate treated guar gum, 5 percent NaHCO₃ and 2 percent of a commercially available polyacrylamide which demonstrated a pH value ranging from about 8 to 10 when 10 pounds were dissolved in 1000 gal. of water. The second formulation (noted as blend B) consisted of 90 percent borate treated guar gum, 8 percent NaHCO₃ and 2 percent of

TABLE VII

| Test No. | Pounds of cellophane flake per 1,000 gallons of composition | Temp., °F. | Hydraulic pressure in p.s.i. | Extrusion through pipe having diameter of— | | |
|---|---|---|---|---|---|---|
| | | | | ⅛ inch | ¼ inch | ½ inch |
| 77 | None | 225 | 20 | Rapid | 1 inch in 10 sec. | No movement. |
| 78 | None | 225 | 50 | | | Do. |
| 79 | None | 225 | 100 | | | 1 in. in 30 sec. |
| 80 | 25 | 225 | 20 | Rapid | 1 inch in 10 sec. | No movement. |
| 81 | 25 | 225 | 100 | | | Do. |
| 82 | 25 | 225 | 200 | | | Held for 3 min. and then extruded rapidly. |
| 83 | 100 | 225 | 20 | Rapid | 1 inch in 15 sec. | No movement. |
| 84 | 100 | 225 | 200 | | | Do. |
| 85 | 100 | 225 | 1,700 | | | Held for 2 min. and then extruded rapidly. |

A 12-inch long, 2-inch diameter pipe nipple was equipped with caps. The lower cap contained threaded ⅛, ⅜ and ¼-inch diameter openings. The openings which were not being tested were plugged.

The gelable composition of the invention consisted essentially of borated guar gum, polyacrylamide (average weight between about 1,000,000 and 3,000,000) and water to make proportions of 500 pounds of the gum and 50 pounds of the polyacrylamide per 1,000 gallons of water.

The composition was poured into the 12-inch by 2-inch pipe and subjected to an advanced temperature for a period of 20 hours and at the pressure shown in the Table VII. Cellophane flake was added in the tests, as shown in the table, as a fluid loss additament.

Reference to Table VII shows that the gelled composition of the invention can be readily extruded into the larger opening and passageways as in an earthen formation being treated, e.g., fractured, where entrance of excessive amounts of the treating fluid into the larger openings is undesired, but will not so readily enter the smaller openings and passageways where entrance of the treating fluid is desired.

a commercially available polyacrylamide having a substantially neutral pH in aqueous solutions.

The indicated formulations were thoroughly mixed into tap water having a preadjusted pH value. A sufficient amount of blend A or B was employed to make up solutions equivalent to a concentration of 300 lbs. or 500 lbs. of blend per 1000 gallons of solution. After the blends were mixed with the water, sodium dichromate (about 3.0% by weight) was added and the so-formed gel solution was contained in a glass beaker. The pH of the water was adjusted by the addition of HCl or NaOH prior to the addition of the blend. The pH of the water was determined before and after mixing with each blend. The hydration rate was determined as the period of time required for the viscosity of the gel solution to reach 100 poise as measured by a Brookfield viscosimeter at 60 r.p.m. using a No. 3 or No. 4 spindle. The blend concentration of each composition, concentration of sodium dichromate (based on lbs./1000 gallons of solution), a pH of water before adding the concentrate, after adding the concentrate, after adding the sodium dichromate, and the time for the gel solution to reach 100 poise is set forth in the following Table VIII.

As indicated in the table, at a pH value below about 3, i.e., Test No. 101, the gel solution set up immediately prior to adding the sodium dichromate catalyst. Likewise, at a pH of about 10 or more in the mixing water a prolonged setting time occurred.

and then either $KBrO_3$ or an enzyme (identified as enzyme breaker D from the Stein Hall Company) was added as a degradation agent. The gel solution was allowed to set up in 4 oz. glass jars. The viscosity was determined as in Example 8, at various periods of time,

TABLE VIII

| Test No. | Blend | Concentration lbs./1,000 gal H₂O solution | | pH of mixing water | pH after adding polymer formulations | pH after adding sodium dichromate | Time (min.) required to reach 100 poises |
|---|---|---|---|---|---|---|---|
| | | Blend | Sodium dichromate | | | | |
| 86 | A | 300 | 9 | 7.7 | 8.45 | 7.3 | 20 |
| 87 | A | 300 | 8 | 7.7 | 8.45 | 7.4 | 34 |
| 88 | A | 300 | 8 | ¹ 5.9 | 8.25 | 7.25 | 20 |
| 89 | A | 300 | 8 | ¹ 10.05 | 8.55 | 7.5 | 110 |
| 90 | A | 500 | 14 | 7.7 | 8.3 | 7.3 | 27 |
| 91 | A | 500 | 15 | 7.7 | 8.3 | 7.2 | 22 |
| 92 | B | 500 | 15 | 7.4 | 8.1 | 7.25 | 23 |
| 93 | B | 500 | 15 | ¹ 5.6 | 8.0 | 7.2 | 20 |
| 94 | B | 500 | 15 | ¹ 4.0 | 8.0 | 7.2 | 13 |
| 95 | B | 500 | 15 | ¹ 9.5 | 8.1 | 7.3 | 30 |
| 96 | B | 500 | 15 | ¹ 10.1 | 8.3 | 7.4 | 42 |
| 97 | B | 300 | 8 | 7.7 | 8.2 | 7.4 | 20 |
| 98 | B | 300 | 8 | ¹ 5.6 | 8.2 | 7.4 | 20 |
| 99 | B | 300 | 8 | ¹ 4.0 | 8.0 | 7.3 | 15 |
| 100 | B | 300 | 8 | ¹ 3.0 | 8.0 | 7.3 | 8 |
| 101 | B | 300 | 8 | ¹ 2.0 | Polymer gelled when added to water | | |
| 102 | B | 300 | 8 | ¹ 9.5 | 8.0 | 7.2 | 27 |
| 103 | B | 300 | 8 | ¹ 10.1 | 8.3 | 7.5 | 42 |

¹ pH of tap water adjusted with HCl or NaOH.

EXAMPLE 9

As in Example 8 a formulation was prepared corresponding essentially to blend A. In the present example, tests were run to determine the plug life (i.e., the time for the set gel to degrade to reach a viscosity of 50 poise) of the gel. Various concentrations of blend A (based on lbs. of blend A per 1000 gallons of solution), cross-linking agent (consisting of sodium dichromate) and a degradation agent were employed; and temperatures to which the set gels were subjected are indicated. In each test, blend A was mixed into tap water. Sodium dichromate was added and the time (in days) noted when the viscosity of the gel was lowered to 50 poise or less. The temperatures employed, blend of materials, and plug life are noted in the following Table IX. As these tests shown, the degradation rate (plug life) can be adjusted within predetermined limits at various concentrations of gel solutions by varying the amount of degradation agent employed. As also is shown, the higher the temperature to which the set gel is subjected the shorter is its plug life, all other variables remaining constant. Likewise, the higher the concentration of the gel concentrate the longer the plug life, all other variables remaining constant.

TABLE IX

| Test No. | Temp. (° F.) | Blend A Concentration lbs./1,000 gals. solution | Concentration of sodium dichromate, lbs./1,000 gals. solution | Enzyme or KBrO₃ concentration in lbs./1,000 gals. solution | | Plug life (days) |
|---|---|---|---|---|---|---|
| 104 | 60 | 300 | 12 | Enzyme | None | Longer than 36. |
| 105 | 60 | 300 | 12 | ...do | 2.0 | 1. |
| 106 | 60 | 300 | 12 | ...do | 1.5 | 2. |
| 107 | 60 | 300 | 12 | ...do | 1.0 | 4. |
| 108 | 60 | 300 | 12 | ...do | 0.5 | 7. |
| 109 | 60 | 300 | 12 | ...do | 0.25 | 22. |
| 110 | 60 | 500 | 20 | ...do | None | Longer than 40. |
| 111 | 60 | 500 | 20 | ...do | 7.0 | 2. |
| 112 | 60 | 500 | 20 | ...do | 5.0 | 3. |
| 113 | 60 | 500 | 20 | ...do | 3.0 | 7. |
| 114 | 60 | 500 | 20 | ...do | 2.5 | 8. |
| 115 | 60 | 500 | 20 | ...do | 2.0 | 13. |
| 116 | 60 | 500 | 20 | ...do | 1.5 | 21. |
| 117 | 60 | 500 | 20 | ...do | 1.0 | Longer than 30. |
| 118 | 60 | 500 | 20 | ...do | 0.5 | Longer than 40. |
| 119 | 75 | 300 | 10 | ...do | None | 23. |
| 120 | 75 | 300 | 10 | ...do | 2.0 | 1. |
| 121 | 75 | 300 | 10 | ...do | 1.5 | 2. |
| 122 | 75 | 300 | 10 | ...do | 1.0 | 3. |
| 123 | 75 | 300 | 10 | ...do | 0.5 | 6. |
| 124 | 75 | 300 | 10 | ...do | 0.25 | 9. |
| 125 | 75 | 500 | 16 | ...do | None. | Longer than 33. |
| 126 | 75 | 500 | 16 | ...do | 7.0 | 1. |
| 127 | 75 | 500 | 16 | ...do | 5.0 | 2. |
| 128 | 75 | 500 | 16 | ...do | 3.0 | 3. |
| 129 | 75 | 500 | 16 | ...do | 2.0 | 5. |
| 130 | 75 | 500 | 16 | ...do | 1.0 | 8. |
| 131 | 75 | 500 | 16 | ...do | 0.5 | 14. |
| 132 | 75 | 500 | 16 | ...do | 0.25 | 33. |
| 133 | 100 | 300 | 8 | ...do | None | 9. |
| 134 | 100 | 300 | 8 | ...do | 1.0 | 2. |
| 135 | 100 | 300 | 8 | ...do | 0.5 | 3.5. |
| 136 | 100 | 300 | 8 | ...do | 0.25 | 5. |
| 137 | 100 | 300 | 8 | ...do | 0.1 | 7. |
| 138 | 100 | 500 | 12 | ...do | None | Longer than 21. |
| 139 | 100 | 500 | 12 | ...do | 3 | 1. |
| 140 | 100 | 500 | 12 | ...do | 2 | 2. |
| 141 | 100 | 500 | 12 | ...do | 1.5 | 3.5. |
| 142 | 100 | 500 | 12 | ...do | 1 | 5. |
| 143 | 100 | 500 | 12 | ...do | 0.5 | 8. |
| 144 | 100 | 500 | 12 | ...do | 0.25 | 12. |
| 145 | 100 | 500 | 12 | ...do | 0.1 | 17. |
| 146 | 125 | 300 | 7 | ...do | None | 8. |
| 147 | 125 | 300 | 7 | ...do | 1.5 | 1. |
| 148 | 125 | 300 | 7 | ...do | 1.0 | 2. |
| 149 | 125 | 300 | 7 | ...do | 0.5 | 3. |
| 150 | 125 | 300 | 7 | ...do | 0.25 | 4. |
| 151 | 125 | 300 | 7 | ...do | 0.1 | 6. |

TABLE IX—Continued

| Test No. | Temp. (° F.) | Blend A Concentration lbs./1,000 gals. solution | Concentration of sodium dichromate, lbs./1,000 gals. solution | Enzyme of KBrO3 concentration in lbs./1,000 gals. solution | | Plug life (days) |
|---|---|---|---|---|---|---|
| 152 | 125 | 500 | 11 | ...do...... | None | Longer than 21. |
| 153 | 125 | 500 | 11 | ...do...... | 3.0 | 2. |
| 154 | 125 | 500 | 11 | ...do...... | 2.0 | 3. |
| 155 | 125 | 500 | 11 | ...do...... | 1.5 | 5. |
| 156 | 125 | 500 | 11 | ...do...... | 1.0 | 6. |
| 157 | 125 | 500 | 12 | KBrO3.... | None | Longer than 21. |
| 158 | 125 | 500 | 12 | KBrO3.... | 10 | 4. |
| 159 | 125 | 500 | 12 | KBrO3.... | 7 | 5. |
| 160 | 125 | 500 | 12 | KBrO3.... | 5 | 7. |
| 161 | 125 | 500 | 12 | KBrO3.... | 3 | 11. |
| 162 | 125 | 500 | 12 | KBrO3.... | 1 | Longer than 21. |
| 163 | 150 | 500 | 10 | KBrO3.... | None | Do. |
| 164 | 150 | 500 | 10 | KBrO3.... | 10 | 2. |
| 165 | 150 | 500 | 10 | KBrO3.... | 7 | 3. |
| 166 | 150 | 500 | 10 | KBrO3.... | 5 | 5. |
| 167 | 150 | 500 | 10 | KBrO3.... | 3 | 10. |
| 168 | 150 | 500 | 10 | KBrO3.... | 1 | Longer than 21. |
| 169 | 175 | 500 | 8 | KBrO3.... | None | 21. |
| 170 | 175 | 500 | 8 | KBrO3.... | 7 | 1. |
| 171 | 175 | 500 | 8 | KBrO3.... | 5 | 2. |
| 172 | 175 | 500 | 8 | KBrO3.... | 3 | 4. |
| 173 | 175 | 500 | 8 | KBrO3.... | 2 | 7. |
| 174 | 175 | 500 | 8 | KBrO3.... | 1 | 11. |
| 175 | 175 | 500 | 8 | KBrO3.... | 0.5 | 16. |
| 176 | 175 | 500 | 8 | KBrO3.... | 0.25 | 18. |
| 177 | 175 | 500 | 8 | KBrO3.... | 0.1 | 20. |
| 178 | 175 | 500 | 7 | KBrO3.... | None | 14. |
| 179 | 175 | 500 | 7 | KBrO3.... | 5 | 1. |
| 180 | 175 | 500 | 7 | KBrO3.... | 3 | 2. |
| 181 | 175 | 500 | 7 | KBrO3.... | 2 | 4. |
| 182 | 175 | 500 | 7 | KBrO3.... | 1 | 8. |

EXAMPLE 10

This series of tests was used to determine the fluid loss and formation damage of a gel formulation within the scope of the present invention. The blend A formulation of Example 8 was used as the test formulation, caused by the plug. The results of these tests are set forth in the following Table X. As evidenced by the results obtained, the plug composition of the present invention retained fluid much better than another standard commercially employed composition.

TABLE X

| Test No. | Temp. (° F.) | Blend composition | Conc. Blend A, lbs./1,000 gallons solution | Sodium dichromate, lbs./1,000 gallons solution | Enzyme, lbs./1,000 gallons solution | Time elapsed before pressure applied, min. | 2% CaCl2 brine permeability before test, md. | Fluid loss in mls. after time elapsed (min.) | | | | | 2% CaCl2 brine permeability after plug degradation | Percent damaged caused by plug |
|---|---|---|---|---|---|---|---|---|---|---|---|---|---|---|
| | | | | | | | | 1 | 4 | 9 | 16 | 25 | | |
| 183 | 125 | A | 300 | 7 | 2 | 15 | 421 | 0.3 | 0.4 | 0.5 | 0.5 | 0.6 | 259 | 38.0 |
| 184 | 125 | A | 500 | 11 | 3 | 15 | 404 | 0.3 | 0.6 | 0.8 | 0.9 | 1.0 | 216 | 46.5 |
| 185 | 80 | A | 300 | 7 | 2 | 5 | 445 | 0.3 | 0.5 | 0.6 | 0.8 | 1.0 | 22 | 50.0 |
| 186 | 80 | A | 300 | 7 | None | 4 | [2] 542 | 3.0 | 4.0 | 4.5 | 4.5 | 5.0 | [3] N.T. | [3] N.T. |
| 187 | 80 | A | 300 | [1] 5 | None | 5 | [2] 600 | 7.0 | 9.0 | 11.5 | 12.5 | 13.0 | [3] N.T. | [3] N.T. |
| 188 | 80 | Standard | None | None | 2 | 5 | 441 | 5.0 | 20.0 | [4] | [4] | [4] | 175 | 60.0 |

[1] Gel purposely designed to have prolonged setting time. Plug had less than 1,000 centipoise after 25 minutes hydration.
[2] Permeability to air.
[3] N.T.=Not tested.
[4] Outlet closed to retain fluid.

As a comparison, a composition containing guar gum (300 lb./1000 gallons solution) phthalic anhydride (3.2 lbs./1000 gallons solution) and an enzyme (2 lbs./1000 gallons of solution) was employed. This was a commercially available standard sealing and plugging composition. The fluid loss and formation damage were determined using Berea sandstone core plugs. The permeability of the core plug to air or to 2% calcium chloride brine was determined.

The blend A formulation was slurried into tap water. The degradation agent, consisting of an enzyme (enzyme breaker D) was added, followed by the sodium dichromate. The slurry was agitated with a Palo stirrer, and then by a mechanical shaker after the slurry was contained in the Baroid pressure test cell. The time elapsed before applying pressure to the cell was determined by the temperature and the approximate time which would be required for the slurry to be pumped into a wellbore. When the fluid loss test was completed, the plug was sealed in the Baroid pressure test cell until it was degraded. The time required for degradation was obtained from the degradation tests. The core plug was removed and the permeability to 2% CaCl2 brine again determined. The difference between the original CaCl2 brine permeability and the final CaCl2 brine permeability was the basis for calculating the percent damage

EXAMPLE 11

In this example, the ability of various metal ions to cross-link guar gum, locust bean gum and sodium alginate was tested. The ability to cross-link was determined by extrusion of the set gel through 4 inches of 20–40 mesh sand. The extrusion rate (mls./min.) was determined at various pressures after aging the gel. The procedure consisted of slurrying the gum into tap water. A bactericide was then added to the water slurry to retard bacterial degradation of the gum. A cross-linking agent was then added to the slurry.

Ammonium hydroxide or acetic acid was used to adjust the slurry pH to between 6.9 and 7.1. After the slurry had obtained a viscosity of at least 1000 centipoise, it was poured into a 2-inch diameter by 12-inch long pipe containing 4 inches of 20–40 mesh sand. The pipe caps were equipped with ¼ inch holes. The lower cap opening was covered with 20–40 mesh screen to retain the sand. The set gel was extruded with either air or hydraulic pressure. The volume of set gel extruded per minute was recorded at various pressures after aging the gel at 77° F.

The results of these tests are set forth in the following Table XI.

TABLE XI

| Test No. | Type of gum | Gum conc., lbs./1,000 gal. | Cross-linking agent | Concentration of metal salt (percent of gum wt.) | Extrusion rate of the gel (mls./min.) at various pressures after aging the gel at 77° F. for— | | | | | |
|---|---|---|---|---|---|---|---|---|---|---|
| | | | | | 4 hours | | | 24 hours | | |
| | | | | | 500 p.s.i. | 1,000 p.s.i. | 2,000 p.s.i. | 500 p.s.i. | 1,000 p.s.i. | 2,000 p.s.i. |
| 189 | Guar | 300 | None | None | 8.0 | 25.0 | | 14.0 | 35.0 | |
| 190 | do | 300 | $CoCl_2 \cdot 6H_2O$ | 0.1 | 14.0 | | | 3.0 | | |
| 191 | do | 300 | $CoCl_2 \cdot 6H_2O$ | 1.0 | 65.0 | | | 42.0 | | |
| 192 | do | 300 | $CoCl_2 \cdot 6H_2O$ | 10.0 | 72.0 | | | 4.0 | | |
| 193 | do | 300 | $Cr(NO_3)_3$ | 0.1 | 5.0 | | | 4.0 | | |
| 194 | do | 300 | $Cr(NO_3)_3$ | 1.0 | 5.0 | | | 0 | 0 | 4.0 |
| 195 | do | 300 | $Cr(NO_3)_3$ | 10.0 | 4.0 | | | 0 | 0 | 2.0 |
| 196 | do | 300 | $ZrOCl_2$ | 0.1 | 1.0 | | | 0 | 0 | 0 |
| 197 | do | 300 | $ZrOCl_2$ | 1.0 | 3.0 | | | 0 | 0 | 5.0 |
| 198 | do | 300 | $ZrOCl_2$ | 10.0 | 70.0 | | | 6.0 | | |
| 199 | do | 300 | $Al_2(SO_4)_3 \cdot 18H_2O$ | 0.1 | 8.0 | | | 16.0 | | |
| 200 | do | 300 | $Al_2(SO_4)_3 \cdot 18H_2O$ | 1.0 | 23.9 | | | 50.0 | | |
| 201 | do | 300 | $Al_2(SO_4)_3 \cdot 18H_2O$ | 10.0 | 75.0 | | | 22.0 | | |
| 202 | do | 300 | $SnCl_4 \cdot 5H_2O$ | 0.1 | 3.0 | | | 1.0 | 8.0 | |
| 203 | do | 300 | $SnCl_4 \cdot 5H_2O$ | 1.0 | 0 | 0 | 3.0 | 0 | 0 | 0 |
| 204 | do | 300 | $SnCl_4 5H_2O$ | 10.0 | 0 | 3.0 | 0 | 0 | 0 | 0 |
| 205 | do | 300 | $NiCl_2 8H_2O$ | 0.1 | 0 | 0 | 4.0 | 0 | 0 | 2.0 |
| 206 | do | 300 | $NiCl_2 \cdot 6H_2O$ | 1.0 | 0 | 0 | 6.0 | 0 | 0 | 1.0 |
| 207 | do | 300 | $NiCl_2 \cdot 6H_2O$ | 10.0 | 2.0 | 6.0 | | 4.0 | 12.0 | |
| 208 | do | 300 | $CaCl_2$ | 0.1 | 10.0 | | | 6.0 | | |
| 209 | do | 300 | $CaCl_2$ | 1.0 | 6.0 | | | 9.0 | | |
| 210 | do | 300 | $CaCl_2$ | 10.0 | 5.0 | | | 5.0 | | |
| 211 | do | 300 | $CrCl_2 \cdot 6H_2O$ | 0.1 | 0 | 3.0 | | 0 | 3.0 | |
| 212 | do | 300 | $CrCl_2 \cdot 6H_2O$ | 1.9 | 120.0 | | | 0 | 2.0 | |
| 213 | do | 300 | $CrCl_2 \cdot 6H_2O$ | 1.0 | 9.0 | | | 0 | 4.0 | |
| 214 | do | 300 | $FeCl_3 \cdot 6H_2O$ | 1.0 | 5.0 | | | 8.0 | | |
| 215 | do | 300 | $FeCl_3 \cdot 6H_2O$ | 10.0 | 9.0 | | | 6.0 | | |
| 216 | do | 300 | $FeCl_2$ | 0.1 | 0 | 1.0 | 5.0 | 100.0 | | |
| 217 | do | 300 | $FeCl_2$ | 1.0 | 6.0 | | | 65.0 | | |
| 218 | do | 300 | $FeCl_2$ | 10.0 | 1.0 | 4.0 | | 0 | 0 | 3 |
| 219 | do | 300 | $Na_2WO_4 \cdot 2H_2O$ | 0.1 | 26.0 | | | 7.0 | 12.0 | |
| 220 | do | 300 | $Na_2WO_4 \cdot 2H_2O$ | 1.0 | 0 | 3.0 | 5.0 | 0 | 1.0 | 2.0 |
| 221 | do | 300 | $NaWO_4 \cdot 2H_2O$ | 10.0 | 0 | 1.0 | 2.0 | 0 | 1.0 | 5.0 |
| 222 | do | 300 | $Na_2WO_4 \cdot 2H_2O$ plus 1% zinc dust. | 10.0 | 0 | 2.0 | 6.0 | 0 | 0 | 1.0 |
| 223 | do | 300 | $NaMoO_4 \cdot 2H_2O$ | 0.1 | 0 | 2.0 | 5.0 | 0 | 6.0 | |
| 224 | do | 300 | $NaMoO_4 \cdot 2H_2O$ | 1.0 | 0 | 1.0 | 4.0 | 0 | 0 | 1.0 |
| 225 | do | 300 | $Na_2MoO_4 \cdot 2H_2O$ | 10.0 | 1.0 | 6.0 | | 0 | 3.0 | 7.00 |
| 226 | Sodium alginate | 83 | None | None | 120.0 | | | 120.0 | | |
| 227 | do | 83 | $Na_2CrO_4 \cdot 4H_2O$ | 1.0 | 204.0 | | | 168.0 | | |
| 228 | do | 83 | $NaCrO_4 \cdot 4H_2O$ | 10.0 | 336.0 | | | 360.0 | | |
| 229 | do | 150 | None | None | | 63.0 | | | 50.0 | |
| 230 | do | 150 | $Na_2CrO_4 \cdot 4H_2O$ | 1.0 | | 56.0 | | | 50.0 | |
| 231 | do | 150 | $Na_2CrO_4 \cdot 4H_2O$ | 10.0 | | 52.0 | | | 50.0 | |
| 232 | do | 150 | $Cr(NO_3)_3 \cdot 9H_2O$ | 1.0 | | 19.0 | | | 18.0 | |
| 233 | do | 150 | $Cr(NO_3)_3 \cdot 9H_2O$ | 10.0 | | 8.0 | | | 7.0 | |
| 234 | do | 300 | None | None | | 6.0 | | | 7.0 | |
| 235 | do | 300 | $Cr(NO_3)_3 \cdot 9H_2O$ | 1.0 | | 2.0 | 56.0 | | 2.0 | 50.0 |
| 236 | do | 300 | $Cr(NO_3)_3 \cdot 9H_2O$ | 10.0 | | 2.0 | 48.0 | | 1.0 | 15.0 |
| 237 | Locust bean gum | 150 | None | None | | 52.0 | | | 16.0 | |
| 238 | do | 150 | $Na_2CrO_4 \cdot 4H_2O$ | 1.0 | | 23.0 | | | 2.0 | |
| 239 | do | 150 | $Na_2CrO_4 \cdot 4H_2O$ | 10.0 | | 17.0 | | | 2.0 | |
| 240 | do | 150 | $Cr(NO_3)_3 \cdot 9H_2O$ | 1.0 | | 2.0 | | | 5.0 | |
| 241 | do | 150 | $Cr(NO_3)_3 \cdot 9H_2O$ | 10.0 | | 3.0 | | | 22.0 | |
| 242 | do | 300 | None | None | | 34.0 | | | 7.0 | 300.0 |
| 243 | do | 300 | $Na_2CrO_4 \cdot 4H_2O$ | 1.0 | | 30.0 | | | 1.0 | 54.0 |
| 244 | do | 300 | $Na_2CrO_4 \cdot 4H_2O$ | 10.0 | | 29.0 | | | 4.0 | 240.0 |

EXAMPLE 12

A composition within the scope of the present invention was employed to cure a loss circulation zone in a borehole. The composition comprised about 500 pounds of the composition previously defined herein as blend B in 960 gallons of water and sodium dichromate. A 7⅞" diameter surface drilled uranium exploration holes was being drilled to a scheduled depth of 4,000 feet employing drilling mud. Circulation was lost at 600 feet. In an attempt to cure the lost circulation several conventional lost circulation control materials except cement had been tried with no success. Drill pipe was run to the bottom of the surface casing at 150 feet. An 80-gallon batch of the composition as defined above was poured into the drill pipe and displaced with drilling mud. The hydrostatic head of drilling mud was used to displace the composition into the lost circulation zone. After letting the material set 40 minutes, the operator started the mud pump and circulation was obtained in five minutes. Drilling was resumed. Several other lost circulation zones were encountered while drilling this hole. All but one was sealed with the same composition. The zone that could not be repaired had to be drilled while losing mud. A string of casing was then set before drilling could be continued. The use of the present composition allowed the operator to drill the hole which otherwise would have been abandoned. The operator now stocks prepared granulated product of the present invention and routinely solves lost circulation problems at a minimum cost without having to call in oil well service companies.

In a second instance, a BX diamond core hole was being drilled upward at an angle of 45° from an underground mine located at 2015-foot level. The rock formation was badly broken. Severe caving conditions had stopped drilling. The length of hole at this time was 90 feet. An open-ended drill rod was run to the end of the hole. A 40-gallon batch of the composition defined above was mixed and pumped through the drill rods. Thirty gallons of the composition were displaced into the trouble zone at 5 gallons per minute and 250 p.s.i. pressure. The material was allowed to set for one hour. The drill rod was retrieved and the core drilling assembly attached. The hole was washed clean and drilling resumed. Total elapsed time from the beginning of the job until drilling was resumed was 4½ hours.

The composition successfully consolidated the trouble zone and drilling proceeded to a total hole length of 475 feet without any further complications.

What is claimed is:

1. A granulated composition which when dispersed in an aqueous carrier liquid forms a viscous slurry which sets up after a period of time to form a stiff gel which subsequently breaks to form a flowable material which comprises, as parts by weight:

(a) from about 150 to about 1500 parts of a particulate galactomannan gum which has been treated with an effective amount of a hydrophobing agent so that when dispersed in an aqueous solution having a neutral to alkaline pH the gum does not not readily hydrate in its normal length of time;
(b) from about 3 to about 60 parts of a readily water-soluble organic polymeric suspending agent, said suspending agent when 2 percent by weight of which is dispersed in water having a pH of about 7 forms an aqueous dispersion having a viscosity of at least 10 centipoise at a temperature of 25° C. the suspending action of which is not effected by the hydrophobing agent;
(c) buffering agent in an amount which is effective to provide an initial pH in an aqueous solution in which the granulated composition is dispersed of at least about 7.5 in an amount ranging from about 0.6 to about 40 percent by weight of said galactomannan gum;
(d) a hydration agent which in solution in water automatically decreases the pH of an aqueous dispersion of said composition after a period of time to an acidic value; and
(e) an amount of a cross-linking agent which is effective to cross-link the hydrated gum in an acidic aqueous solution said cross-linking agent comprising a water soluble compound containing a polyvalent metal cation which forms an insoluble hydroxide in an aqueous dispersion having a pH lower than about 7.

2. The composition as defined in claim 1 and including an effective amount of a degradation agent for a cross-linked hydrated form of said galactomannan gum to reverse the cross-linked form to a flowable material.

3. The composition as defined in claim 2 comprising:
(a) from about 150 to about 1500 parts of said galactomannan gum;
(b) from about 3 to about 60 parts of said suspending agent;
(c) from about 12 to about 120 parts of a buffering agent;
(d) from about 0.5 to about 100 parts of said hydrating agent;
(e) from about 0.1 to about 300 parts of said cross-linking agent; and
(f) up to 20 parts of said degradation agent.

4. The composition of matter as defined in claim 3 wherein said suspending agent consists of a synthetic water-soluble polymer and said cross-linking and hydrating agents consist of a single compound comprising a metal salt of a strong acid containing an ion which cross-links said galactomannan gum.

5. The composition as defined in claim 3 wherein said
(a) galactomannan gum consists of guar gum;
(b) said suspending agent consists of an acrylamide polymer having an average molecular weight ranging from about 1 to about 3 million; and
(c) said cross-linking and hydrating agent consists of a salt containing a chromium metal ion.

6. The composition as defined in claim 3 wherein said buffering agent consists of sodium bicarbonate, said cross-linking and hydrating agent consists of a single compound being a member selected from the group consisting of sodium dichromate, chromic nitrate or chromium chloride.

7. The composition as defined in claim 3 wherein said composition comprises:
(a) a borate treated guar gum from about 300 to 750 parts;
(b) polyacrylamide having an average molecular weight ranging from about 1 to about 3 million, about 6 to 30 parts;
(c) sodium bicarbonate about 24 to 60 parts;
(d) a cross-linking and hydrating agent comprising a single compound of sodium dichromate or chromic nitrate about 2.0 to 50 parts; and
(e) an inorganic breaker or an enzyme degradation agent about 1 to 15 parts.

8. A granulated composition of matter comprising, as parts by weight:
(a) from about 300 to about 750 parts of a particulate galactomannan gum treated with a boron containing compound to render the gum less hydrophilic than normal when dispersed in an aqueous solution having a pH value of at least about 7.5 or greater;
(b) a suspending agent consisting of at least one of a water-soluble homopolymer or copolymer of acrylamide or methacrylamide having an average molecular weight ranging from about 1 to about 3 million, from about 6 to about 30 parts;
(c) as a pH control agent a material which buffers an aqueous solution to provide a pH value of at least 7.5 or greater, from about 24 to about 60 parts;
(d) an acidic material which has a time delay hydrolysis rate when dispersed in an aqueous solution, to lower the pH thereof;
(e) a water soluble compound which releases multivalent metal ions in at least aqueous solutions having an acidic pH said ions characterized as forming an insoluble hydroxide from an aqueous solution having a pH lower than about 7 to cross-link the hydrated form of said galactomannan gum; and
(f) a degradation agent for cross-linked galactomannan gum consisting of an inorganic breaker or an enzyme.

9. A slurry composition which comprises the following constituents in the indicated proportions:
(a) from about 150 to about 1500 pounds of a particulate galactomannan gum which has been treated with an effective amount of a hydrophobing agent so that the gum is less hydrophilic than normal when dispersed in an aqueous solution having about a neutral to alkaline pH value and a normal hydrophilic characteristic in aqueous solution having an acidic pH value;
(b) a water-soluble organic polymeric suspending agent not being effected by said hydrophobing agent and said suspending agent producing about a neutral to alkaline pH value when dispersed in an aqueous solution said suspending agent when 2 percent by weight of which is dispersed in water having a pH of about 7 forms an aqueous dispersion having a viscosity of at least 10 centipoise at a temperature of 25° C., from about 3 to about 60 pounds;
(c) an effective amount of an acidic material having a delayed action hydrolysis rate to change the pH value of the slurry to an acid pH value after a period of time;
(d) an effective amount of a cross-linking agent for hydrated galactomannan gum consisting of a water-soluble compound containing a polyvalent metal cation which forms an insoluble hydroxide in an aqueous dispersion having a pH lower than about 7; and
(e) a sufficient amount of a buffered aqueous solution to make 1000 gallons of said slurry, said slurry having an initial pH value of at least about 7.5.

10. The slurry composition as defined in claim 9 wherein the treated galactomannan gum is guar, tara or locust bean treated with an effective amount of a material which releases borate ions when dispersed in water.

11. The slurry composition as defined in clam 10 wherein the water-soluble organic polymeric suspending agent is at least one of a water-soluble homopolymer or copolymer of acrylamide or methacrylamide having an average molecular weight ranging from about 1 to about 3 million.

12. The slurry composition as defined in claim 11 wherein said treated galactomannan gum is provided in an amount ranging from about 300 to about 750 pounds.

13. The slurry composition as defined in claim 12 wherein said suspending agent is provided in an amount ranging from about 6 to about 30 pounds.

14. The slurry composition as defined in claim 11 wherein said buffered solution is prepared by dissolving an effective amount of at least one of a $$NaH_2PO_4\text{-}Na_2HPO_4,$$

boric acid-borax, sodium carbonate-sodium bicarbonate, sodium bicarbonate, boric acid-sodium hydroxide or citric acid-sodium hydroxide, in the aqueous solution.

15. The slurry composition as defined in claim 11 wherein the acid material is at least one of propionic acid, maleic acid, succinic acid, tartaric acid or citric acid.

16. The slurry composition as defined in claim 11 includes in addition a degradation agent for a cross-linked hydrated form of said galactomannan gum.

17. The slurry composition as defined in claim 11 wherein the cross-linking agent is a material which disassociates in an aqueous solution to releast at least one cross-linking ion of $Sb^{+3}$, $Bi^{+3}$, $Sb^{+1}$, $BiO^{+1}$, $Sn^{+2}$, $Cr^{+3}$, $Sn^{+4}$, $Zr^{+3}$, $Co^{+2}$, $Ni^{+2}$, $Fe^{+2}$, $MoO_4^{-2}$, $WO_4^{-2}$ or $CrO_4^{-2}$ 18. A slurry composition which comprises:
 (a) from about 300 to about 750 pounds of a galactomannan gum which is treated with an effective amount of a material which releases borate ions when dispersed in an aqueous solution to render the gum less hydrophilic than normal when dispersed in an aqueous solution having about a neutral to alkaline pH value and normal hydrophilic characteristics in aqueous solution having an acidic pH value;
 (b) a water-soluble organic polymeric suspending agent of at least one of a water-soluble homopolymer or copolymer of acrylamide or methacrylamide having an average molecular weight ranging from about 1 to about 3 million from about 6 to about 30 pounds;
 (c) a buffering agent in an amount ranging from about 24 to about 60 pounds wherein said buffering agent is at least one of $NaH_2PO_4Na_2HPO_4$, boric acid-borax, sodium carbonate-sodium bicarbonate, sodium bicarbonate, citric acid-sodium hydroxide, or boric acid-sodium hydroxide;
 (d) at least one of an acidic material which releases an ion in aqueous solution which cross-links a hydrated galactomannan gum and upon hydrolysis decreases the pH of an aqueous solution, said acid material further characterized as having a characteristic time delayed hydrolysis rate, in an amount sufficient to overcome the effect of said buffering agent after a period of time;
 (e) a sufficient quantity of an aqueous solution to make about 1000 gallons of said slurry composition.

19. The slurry composition as defined in claim 18 including an effective amount of a degradation agent of an inorganic or an enzyme breaker for a cross-linked hydrated galactomannan gum.

References Cited

UNITED STATES PATENTS

| | | | |
|---|---|---|---|
| 3,251,768 | 5/1966 | Walker | 252—8.5 |
| 3,502,149 | 3/1970 | Pence | 166—295 |
| 3,319,715 | 5/1967 | Parks | 175—65 |
| 3,198,268 | 8/1965 | Lindblom et al. | 175—72 |
| 2,868,664 | 1/1959 | Goldstein | 106—208 |
| 3,515,667 | 6/1970 | Mogg | 106—209 |
| 3,615,794 | 10/1971 | Nimerick | 106—209 |
| 3,208,524 | 9/1965 | Horner et al. | 175—72 |
| 3,288,230 | 11/1966 | Braunlich et al. | 175—72 |

WILLIAM H. SHORT, Primary Examiner

E. WOODBERRY, Assistant Examiner

U.S. Cl. X.R.

106—208; 166—295; 175—65, 72; 252—8.5 LC; 260—17.4 R

PO-1050
(5/69)

UNITED STATES PATENT OFFICE
CERTIFICATE OF CORRECTION

Patent No. 3,740,360     Dated June 19, 1973

Inventor(s) K. H. Nimerick

It is certified that error appears in the above-identified patent and that said Letters Patent are hereby corrected as shown below:

Column 9, line 73, delete "ssen" and insert --seen--.

Column 10, line 23, delete "les" and insert --less--.

Column 12, Table IV, Test No. 48, 2nd column, delete "$Na(OH)_2$" and insert --$Na(OH)$--.

Column 14, line 31, delete "formuations" and insert --formulations--.

Column 15, lines 28 & 29, delete "correspond" and insert --correspond- -- and delete "sponding" and insert --ing--.

Column 16, line 29, delete "shown" and insert --show--.

Column 20, Table XI, Test No. 204, 7th column, delete "3.0" and insert --0--.

Column 20, Table XI, Test No. 204, 8th column, delete "0" and insert --3.0--.

Column 20, Table XI, Test No. 221, 4th column, delete "$NaWO_4 \cdot 2H_2O$" and insert --$Na_2WO_4 \cdot 2H_2O$--.

Column 20, Table XI, Test No. 223, 4th column, delete "$NaMoO_4 \cdot 2H_2O$" and insert --$Na_2MoO_4 \cdot 2H_2O$--.

Column 20, Table XI, Test No. 224, 4th column, delete "$NaMoO_4 \cdot 2H_2O$" and insert --$Na_2MoO_4 \cdot 2H_2O$--.

Column 20, Table XI, Test No. 228, 4th column, delete "$NaCrO_4 \cdot 4H_2O$" and insert --$Na_2CrO_4 \cdot 4H_2O$--.

UNITED STATES PATENT OFFICE
CERTIFICATE OF CORRECTION

Patent No. 3,740,360　　　　　　　Dated June 19, 1973

Inventor(s) K. H. Nimerick

It is certified that error appears in the above-identified patent and that said Letters Patent are hereby corrected as shown below:

Column 22, line 44, after "agent", first occurrence insert -- said water solubility of said suspending agent --.

Signed and sealed this 18th day of June 1974.

(SEAL)
Attest:

EDWARD M. FLETCHER, JR.　　　　　C. MARSHALL DANN
Attesting Officer　　　　　　　　　Commissioner of Patents